United States Patent [19]

Shiraishi et al.

[11] Patent Number: 5,732,459

[45] Date of Patent: Mar. 31, 1998

[54] METHOD FOR FIXING A MAGNETIC HEAD SLIDER WITH A SLIDER SUPPORT MEMBER

[75] Inventors: Masashi Shiraishi; Masaharu Ishizuka; Noboru Shinohara, all of Nagano, Japan

[73] Assignee: TDK Corporation, Tokyo, Japan

[21] Appl. No.: 590,284

[22] Filed: Jan. 23, 1996

[30] Foreign Application Priority Data

Jan. 24, 1995 [JP] Japan ..................... 7-027252

[51] Int. Cl.⁶ ..................... G11B 5/48; G11B 21/16
[52] U.S. Cl. ..................... 29/603.06; 29/760; 29/DIG. 1; 156/272.4; 156/275.7
[58] Field of Search .................. 29/603.04, 603.06, 29/830, 841, 458, 739, 760, DIG. 1; 156/272.2, 272.4, 275.7; 360/104; 219/603, 660, 148

[56] References Cited

U.S. PATENT DOCUMENTS

| | | | |
|---|---|---|---|
| 4,520,555 | 6/1985 | Gyi et al. | 29/603.06 |
| 4,700,250 | 10/1987 | Kuriyama | 29/603.06 X |
| 4,963,741 | 10/1990 | McMullin | |
| 5,421,943 | 6/1995 | Tam et al. | 156/275.7 X |
| 5,442,152 | 8/1995 | Shank | 156/272.4 |
| 5,481,795 | 1/1996 | Hatakeyama et al. | 29/830 X |

FOREIGN PATENT DOCUMENTS

| | | |
|---|---|---|
| 70 0000946 | 9/1972 | Ireland . |
| 53-147732 | 12/1978 | Japan . |
| 59-63058 | 4/1984 | Japan . |
| 5-40927 | 2/1993 | Japan . |
| 5-325460 | 12/1993 | Japan . |
| 6-60346 | 3/1994 | Japan . |
| 964298 | 7/1964 | United Kingdom . |
| 991657 | 5/1965 | United Kingdom . |
| 1087855 | 10/1967 | United Kingdom . |

*Primary Examiner*—Peter Vo
*Attorney, Agent, or Firm*—Nikaido, Marmelstein, Murray & Oram LLP

[57] ABSTRACT

A method for fixing members includes a step of inserting a conductive thermosetting adhesive between the members to be bonded with each other, and a step of flowing a current directly through the conductive thermosetting adhesive so that the adhesive is cured itself due to Joule effect caused by the current flowed through the adhesive.

8 Claims, 6 Drawing Sheets

METHOD FOR FIXING A MAGNETIC HEAD SLIDER WITH A SLIDER SUPPORT MEMBER

FIELD OF THE INVENTION

The present invention relates to a method for fixing members, to a method for fixing a floating magnetic head slider used for example in a hard disk device with a slider support member, and to a positioning tool for fixing a magnetic head slider with a slider support member.

DESCRIPTION OF THE RELATED ART

There are several known methods for fixing a floating magnetic head slider to its support member such as a suspension. These are for example (1) a method for bonding the slider to the suspension by means of a thermosetting adhesive, (2) a method for bonding the slider to the suspension by means of an Ultra Violet (UV) curing adhesive, (3) a method for bonding the slider to the suspension by means of both a thermosetting adhesive and a UV curing adhesive, and (4) a method for bonding the slider to the suspension by reflow soldering or welding.

(1) A bonding method using a thermally cured adhesive

This method is described for example in Japanese Patent Unexamined Publication No.6(1994)-60346. As shown in FIG. 1, a magnetic head slider 11 and a suspension 13 on which a thermosetting adhesive 12 is supplied are mounted on a positioning tool for bonding 10. Then, the slider 11 and the suspension 13 together with the tool 10 are heated in an oven to cure the supplied thermosetting adhesive 12 and thus to bond the slider 11 with the suspension 13. In FIG. 1, furthermore, a reference numeral 14 denotes a guide of the slider 11, 15 denotes a press member for pressing the suspension 13 to the slider 11, 16 denotes its press spring, 17 denotes a press member for pressing the suspension 13, 18 denotes its press spring, 19a denotes an alignment pin inserted into a reference hole of the suspension 13, and 19b denotes an alignment pin inserted into an attachment hole of the suspension 13.

Bonding of the slider 11 to the suspension 13 by means of the thermally cured adhesive 12 will result a sufficient bonding strength even if the adhesive area is small. However, according to the above-mentioned prior art, since the positioning tools are heated in the oven together with the sliders and the suspensions during curing process of the adhesive, a large number of the positioning tools are necessary depending upon the number of the magnetic heads to be manufactured. Therefore, it is difficult to keep the alignment precision of all the positioning tools in a desired level because of the dispersion of the many positioning tools. Furthermore, as the positioning tools are affected to heating in the oven, their alignment precision will be thermally deteriorated. Accordingly, it has been quite difficult to manage the alignment precision of the positioning tools to keep in a high level. In addition, since not only the slider and the suspension but also the positioning tool are heated, their heat capacity will be increased causing their heating time to lengthen and their heating conditions are limited to the minimum heat-resisting characteristics of the positioning tool.

(2) A bonding method using UV curing adhesive

According to this method described for example in Japanese Patent Unexamined Publication No.5(1993)-325460, a magnetic head slider on which a UV curing adhesive is supplied is superposed at a predetermined position on a suspension using a positioning tool, and then a UV light is radiated thereto so as to cure the supplied UV curing adhesive.

Bonding of the slider to the suspension by means of the UV curing adhesive can prevent alignment precision of the positioning tool from being deviated due to thermal stress because the tool itself is not heated in an oven. However, according to this method, since a part of the adhesive particularly the adhesive between the slider and a flexure of the suspension receives no radiation of the UV light and thus never cure, a sufficient bonding strength cannot be obtained only by the radiation of the UV. Furthermore, in case of small bonding area, it is difficult to expect a desired bonding strength by using only the UV curing adhesive.

In Japanese Patent Unexamined Publication No.5(1993)-40927, it is described that the flexure is constituted by a UV transparent resin in order to reduce non-radiated area of the UV light. However, according to this method, it is necessary to use a flexure made of a specific material and also it is difficult to expect a sufficient bonding strength by using only the UV curing adhesive in case of small bonding area.

(3) A bonding method using both a thermosetting adhesive and a UV curing adhesive According to the method described for example in Japanese Patent Unexamined Publication No.6(1994)-60346, both of a thermosetting adhesive and a UV curing adhesive are simultaneously used for bonding a magnetic head slider with a suspension depending upon the respective curing conditions. Namely, the thermosetting adhesive is used for bonding a part which is difficult to be radiated by the UV light, and the UV curing adhesive is used for the remaining bonding part.

However, using of two kinds of adhesive will result a low production efficiency. Furthermore, since the UV curing adhesive has inherent property of interrupting the cure of the thermosetting adhesive such as epoxy resin, these adhesives must be treated not to be mixed with each other causing the assembling process to be complicated.

(4) A bonding method by reflow soldering or welding

In accordance with this method described for example in Japanese Patent Unexamined Publication No.59(1984)-63058, a magnetic head slider is secured on a suspension by reflow soldering or by welding.

However, according to this method, all of the slider, the suspension and the positioning tool must have heat-resisting characteristics against soldering or welding. Furthermore, it is necessary to form electrodes for soldering or welding on adhering surfaces of the slider and the suspension.

SUMMARY OF THE INVENTION

It is therefore an object of the present invention to provide a method for fixing members and a method for fixing a magnetic head slider with a slider support member, whereby a heat efficiency during thermally curing process of adhesive can be improved and a heating time can be shortened.

Another object of the present invention is to provide a method for fixing a magnetic head slider with a slider support member and a positioning tool, whereby it is not necessary to heat in an oven the positioning tool during thermally curing process of adhesive.

Further object of the present invention is to provide a method and tool for fixing a magnetic head slider with a slider support member, whereby strong bonding can be expected by using only one kind of adhesive.

According to the present invention, a method for fixing members includes a step of inserting a conductive thermosetting adhesive between the members to be bonded with each other, and a step of flowing a current directly through the conductive thermosetting adhesive so that the adhesive is cured itself due to Joule effect caused by the current flowed through the adhesive.

According to the present invention, also, a method for fixing a magnetic head slider with a slider support member includes a step of inserting a conductive thermosetting adhesive between the magnetic head slider and the slider support member to be bonded with each other, and a step of flowing a current directly through the conductive thermosetting adhesive so that the adhesive is cured itself due to Joule effect caused by the current flowed through the adhesive.

Since the conductive thermosetting adhesive itself is heated due to Joule effect by directly flowing a current through this conductive adhesive, only a local area existing the adhesive to be cured is heated. In addition, since the heating source is the adhesive itself, extremely effective curing of the epoxy resin can be expected. Thus, the curing process can be easily performed in a short time.

In assembling the magnetic head slider with its support member, it is preferred that the method further includes a step of mounting the magnetic head slider and the slider support member at a predetermined alignment position on a positioning tool for bonding, a step of temporally bonding the magnetic head slider with the slider support member by the above-mentioned current flowing step, a step of removing the temporally bonded magnetic head slider and slider support member from the positioning tool, and a step of fully bonding the magnetic head slider with the slider support member by further curing the adhesive.

It is not necessary that the positioning tools are heated in the oven together with the sliders and the suspensions during curing process of the adhesive. Thus, a large number of the positioning tools are not necessary depending upon the number of the magnetic heads to be manufactured. Therefore, alignment precision of all the positioning tools can be kept in a desired level and can be prevented from being thermally deteriorated. Particularly, since the conductive thermosetting adhesive itself is heated, remaining portion can be prevented from increase of temperature. Furthermore, since the thermosetting adhesive is used, a sufficient bonding strength can be expected at all bonding area. Also, using only one kind of adhesive will result high production efficiency.

It is preferred that the method further includes a step of detecting real temperature of the conductive thermosetting adhesive, and that the flowing step includes a step of adjusting the current flowing through the conductive thermosetting adhesive depending upon the detected real temperature. Thus, the temperature of the thermosetting adhesive can be precisely controlled by feedback control loop.

Preferably, the conductive thermosetting adhesive is made of an epoxy resin adhesive with a conductive filler. In this case, the conductive filler may be made of a silver filler.

Particularly, it is preferred that a mixed weight ratio of the conductive filler against the epoxy resin is 0.3–0.9 of the conductive filler against 1.0 of the epoxy resin.

Preferably, the current flowed through the conductive thermosetting adhesive is a DC current. In this case, the DC current may be controlled by switching from a constant voltage control to a constant current control depending upon a resistance of the conductive thermosetting adhesive.

It is also preferred that the current flowed through the conductive thermosetting adhesive is an intermittent pulse current.

According to the present invention, furthermore, a method for fixing members includes a step of previously forming a resister pattern on at least one of the members to be bonded with each other, a step of inserting a thermosetting adhesive between the members, and a step of flowing a current through the resister pattern so that the thermosetting adhesive is cured due to Joule effect caused by the current flowed through the resister pattern.

Also, according to the present invention, a method for fixing a magnetic head slider with a slider support member includes a step of previously forming a resister pattern on at least one of the magnetic head slider and the slider support member to be bonded with each other, a step of inserting a thermosetting adhesive between the magnetic head slider and the slider support member, and a step of flowing a current through the resister pattern so that the thermosetting adhesive is cured due to Joule effect caused by the current flowed through the resister pattern.

Since the thermosetting adhesive is heated due to Joule effect by flowing a current through the resister pattern located on the bonding surface, only a local area existing the adhesive to be cured is heated, therefore, extremely effective curing of the epoxy resin can be expected. Thus, the curing process can be easily performed in a short time.

In assembling the magnetic head slider with its support member, it is preferred that the method further includes a step of mounting the magnetic head slider and the slider support member at a predetermined alignment position on a positioning tool for bonding, a step of temporally bonding the magnetic head slider with the slider support member by the above-mentioned current flowing step, a step of removing the temporally bonded magnetic head slider and slider support member from the positioning tool, and a step of fully bonding the magnetic head slider with the slider support member by further curing the adhesive.

It is not necessary that the positioning tools are heated in the oven together with the sliders and the suspensions during curing process of the adhesive. Thus, a large number of the positioning tools are not necessary depending upon the number of the magnetic heads to be manufactured. Therefore, alignment precision of all the positioning tools can be kept in a desired level and can be prevented from being thermally deteriorated. Furthermore, since the thermosetting adhesive is used, a sufficient bonding strength can be expected at all bonding area. Also, using only one kind of adhesive will result high production efficiency.

It is preferred that the method further includes a step of detecting real temperature of the conductive thermosetting adhesive, and that the flowing step includes a step of adjusting the current flowing through the conductive thermosetting adhesive depending upon the detected real temperature. Thus, the temperature of the thermosetting adhesive can be precisely controlled by feedback control loop.

Preferably, the thermosetting adhesive is made of an epoxy resin adhesive.

Furthermore, according to the present invention, a positioning tool for fixing a magnetic head slider with a slider support member includes means for positioning the magnetic head slider and the slider support member at a predetermined alignment position, and a current supply means for flowing a current directly through a conductive thermosetting adhesive inserted between the magnetic head slider and the slider support member to be bonded with each other so that the adhesive is cured itself due to Joule effect caused by the current flowed through the adhesive.

It is preferred that the tool further includes means for detecting real temperature of the conductive thermosetting adhesive, and means for adjusting the current flowing through the conductive thermosetting adhesive depending upon the detected real temperature. Thus, the temperature of the themosetting adhesive can be precisely controlled by feedback control loop.

Further objects and advantages of the present invention will be apparent from the following description of the preferred embodiments of the invention as illustrated in the accompanying drawings.

DESCRIPTION OF THE PREFERRED EMBODIMENTS

Figure 1:
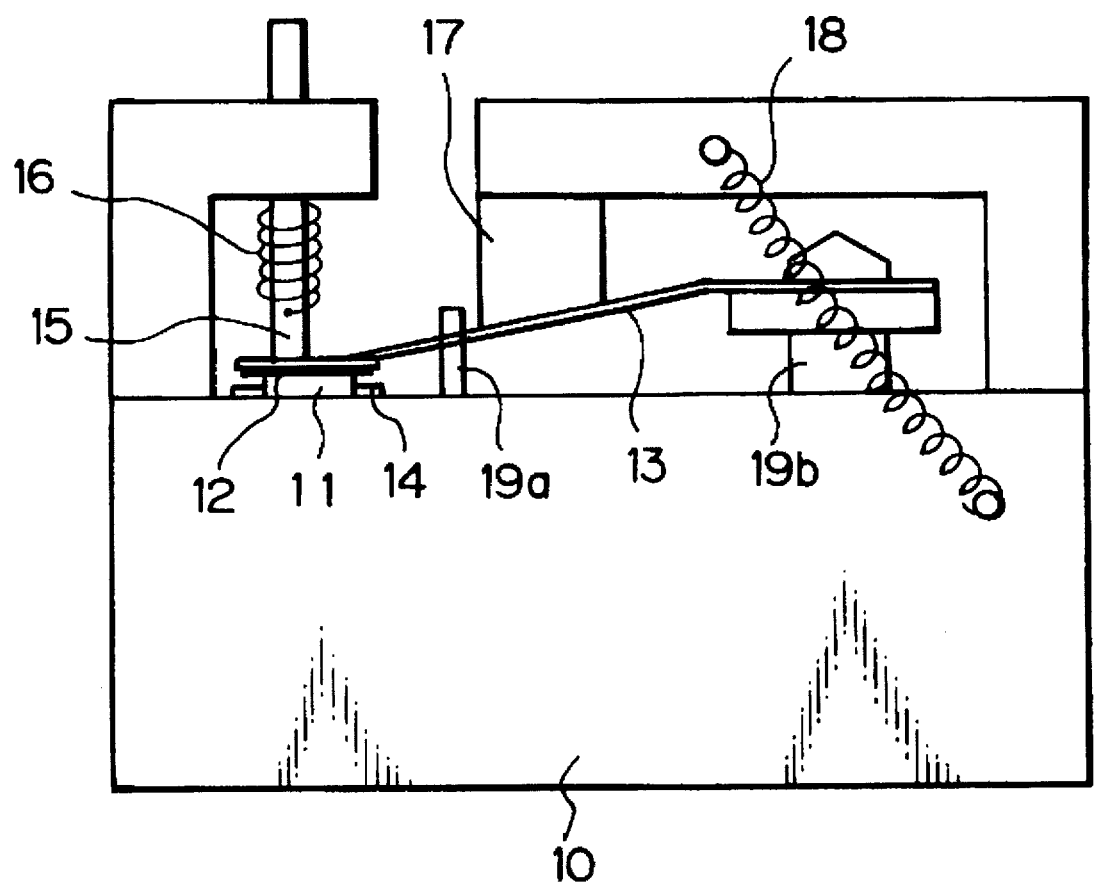
FIG. 1 shows a side view of the positioning tool with the magnetic head slider and the suspension according to a conventional fixing method already described.
Figure 2:
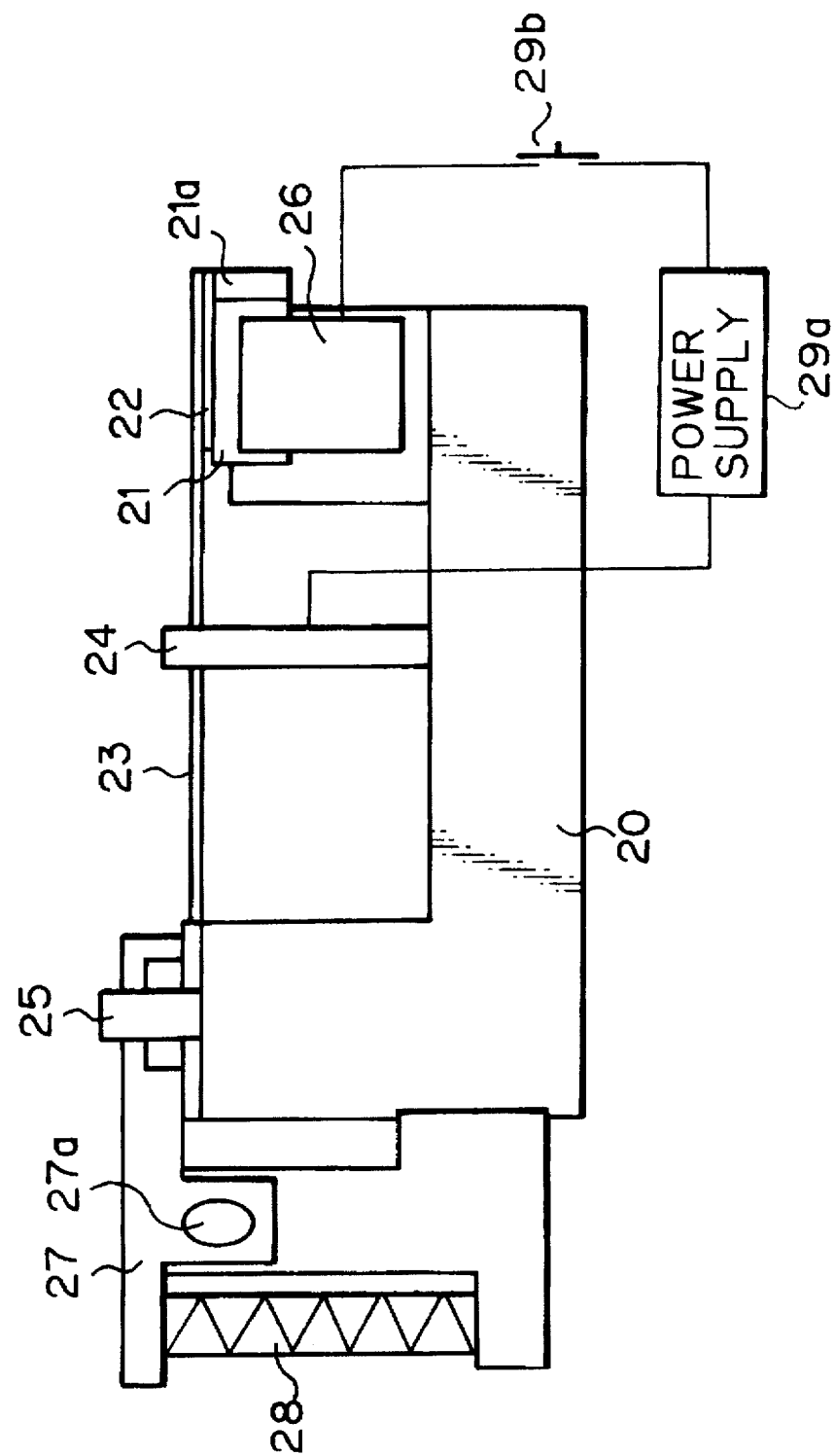
FIG. 2 shows a side view of a positioning tool with a magnetic head slider and a suspension in a preferred embodiment of a method according to the present invention.

FIG. 2 shows a side view of a positioning tool with a magnetic head slider and a suspension in a preferred embodiment of a method according to the present invention.

In the figure, a reference numeral 20 denotes a positioning tool for bonding, and 21 denotes a magnetic head slider mounted at a predetermined position on the positioning tool 20, respectively. A conductive thermosetting adhesive 22 is supplied on a bonding surface which is the opposite surface of the ABS (Air Baring Surface) of the slider 21. A slider support member such as a suspension 23 made of metal for example stainless steel is mounted at a predetermined position on the tool 20 so as to be superposed on the slider 21. An alignment of the suspension 23 is performed by means of a conductive alignment pin 24 inserted into a reference hole of the suspension 23 and by an electrically insulated alignment pin 25 inserted into an attachment hole of the suspension 23. In FIG. 2, furthermore, a reference numeral 26 denotes at least one conductive stopper abutted to at least one side surface of the slider 21, and 27 denotes a press member of the suspension 23. This press member 27 is attached to the tool 20 movably about a fulcrum 27a and actuated by a spring 28 so as to temporally fix a base portion of the suspension 23 to the tool 20.

A DC power supply 29a and a switch 29b are electrically connected in series between the conductive pin 24 and the conductive stopper 26. The DC power supply 29a is constituted by a power source with a regulator, which performs a constant voltage control when its load resistance is high and is switched into a constant current control when the load resistance lowers. Such DC power supply can be realized by for example a DC power source PAD 35-5L manufactured by KIKUSUI ELECTRONICS Co., Ltd.. Almost portions of the tool 20 except for the conductive pin 24 and the conductive stopper 26 are made of insulator material. The magnetic head slider 21 is made of conductive material such as Al-TiC except for a magnetic head transducer portion 21a protected by an insulator material film. The suspension 23 is of course conductive because it is made of metal.

Therefore, when the switch 29b turns on, a current from the DC power supply 29a flows through a loop of the conductive stopper 26, the magnetic head slider 21, the conductive thermosetting adhesive 22, the suspension 23 and the conductive pin 24 so that the conductive thermosetting adhesive 22 itself generates heat and is cured due to Joule effect caused by the current flowed through the adhesive 22. Strictly speaking, in addition to the generation of heat by the adhesive 22 itself due to Joule effect, the slider 21 and suspension 23 will somewhat generate heat due to Joule effect to contribute the thermal curing of the adhesive 22.

As the conductive thermosetting adhesive 22, in this embodiment, an epoxy resin recommended to be cured under a curing condition of 90° C. for one hour, mixed with a conductive filler is used. As the conductive filler, a silver filler in flaked state such as TCG7N made by TOKURIKI CHEMICAL Co., Ltd. may be used. It is apparent that another kinds of epoxy resin and conductive filler can be utilized.

Hereinafter, fixing processes of the magnetic head slider to the suspension according to this embodiment will be described.

The magnetic head slider 21 is first mounted at a predetermined position on the positioning tool 20. Then, the conductive thermosetting adhesive 22 is supplied on the bonding surface of the slider 21. Thereafter, the suspension 23 is mounted at a predetermined position on the tool 20 so as to be superposed on the slider 21. Then, the switch 29b is turned on and thus a continuous DC current flows through the conductive thermosetting adhesive 22 in a direction perpendicular to its supplied plane. As a result, the adhesive 22 itself generates heat to gel the epoxy resin component so that the slider 21 is temporally bonded with the suspension 23. Duration of the DC current supply depends on the mixed ratio of the conductive filler with the epoxy resin, but is in general about 40 to 50 seconds. Gelation of the epoxy resin will be completed in a period not more than 60 seconds.

After the before mentioned temporal bonding process, the magnetic head slider 21 temporally bonded to the suspension 23 (HGA, Head Gimbal Assembly) is removed from the positioning tool 20. Then, the HGAs separated from the respective tools 20 are heated in an oven at for example 120° C. for one hour so as to fully cure the epoxy resin.

It is experimentally confirmed by the inventors of this application that, in order to provide small stress of the adhesive and sufficient bonding strength, a mixing weight ratio of the conductive filler and the epoxy resin should be selected in a range of 0.3–0.9 of the conductive filler against 1.0 of the epoxy resin, preferably 0.7 of the conductive filler against 1.0 of the epoxy resin.

Following is detail description of this experiment and its result with respect to a relationship between the mixing weight ratio and a stress and bonding strength of the conductive adhesive.

A stress produced by a conductive epoxy resin adhesive can be represented by a changed amount of crown-shaped deflection of members bonded by this adhesive depending upon its circumferential temperature change. A stress characteristics of the conductive epoxy resin adhesive versus mixed weight ratio of the conductive filler, and a bonding strength characteristics of the conductive epoxy resin adhesive versus mixed weight ratio of the conductive filler were experimentally obtained as follows.

A conductive adhesive having a certain mixing weight ratio of conductive filler against epoxy resin, for example, a mixing weight ratio of 0.3 of the conductive filler against 1.0 of the epoxy resin was prepared. Five samples each of which had been supplied this conductive adhesive between the slider 21 and the suspension 23 were then temporally bonded by applying current thereto in accordance with the above-mentioned method. Thereafter, the adhesive of these samples were fully cured in an oven. The curing condition at the temporal bonding was in this example as follows. The current was controlled to a constant current of 0.3 A, the voltage was limited to 5.0 V or less (varied depending upon the resistance of the adhesive, 2-3 V of measured voltage in stationary state), and the duration of current supply was 40 seconds. The curing condition at the fully bonding was at 120° C. for 60 minutes.

The measured result of a crown-state deflection amount at a room temperature of 25° C., a crown-state deflection amount at a low temperature of 5° C., a change in the deflection amount depending upon the temperature change (difference between the both deflection amounts), and a bonding strength based upon a peel test with respect to each of these five bonded samples are shown in Table 1. Furthermore, average values of the five samples with respect to the change in the deflection and the bonding strength are shown in this Table 1.

TABLE 1

| Sample Number | Deflection Amount at Room Temperature of 25° C. (nm) | Deflection Amount at Low Temperature of 5° C. (nm) | Change in the Deflection Amount (nm) | Bonding Strength (gf) |
| --- | --- | --- | --- | --- |
| 1 | 43 | 44 | 1 | 254 |
| 2 | 44 | 49 | 5 | 269 |
| 3 | 52 | 53 | 1 | 274 |
| 4 | 45 | 53 | 8 | 263 |
| 5 | 45 | 49 | 4 | 220 |
| Average | — | — | 3.8 | 256 |

Figure 3:
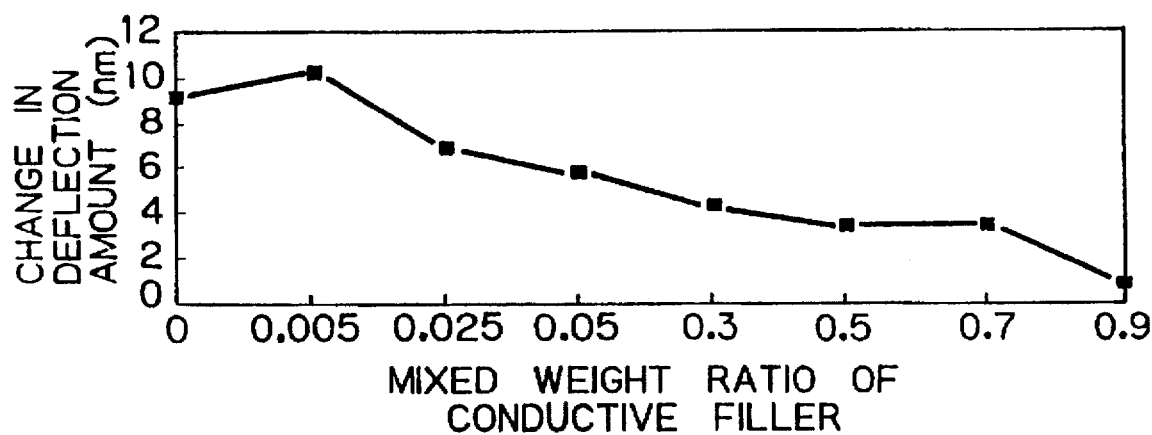
FIG. 3 shows a stress characteristics of a conductive epoxy resin adhesive versus mixed weight ratio of a conductive filler in the embodiment of FIG. 2.
Figure 4:
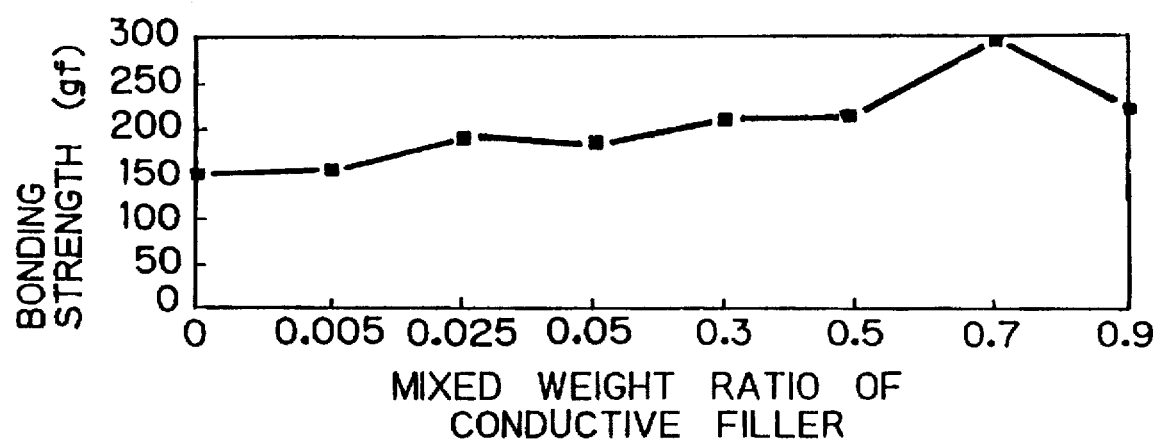
FIG. 4 shows a bonding strength characteristics of a conductive epoxy resin adhesive versus mixed weight ratio of a conductive filler in the embodiment of FIG. 2.

Similar measurements were carried out with respect to different conductive adhesives having various mixing weight ratio such as 0, 0.005, 0.025, 0.05, 0.5, 0.7 and 0.9 of the conductive filler against 1.0 of the epoxy resin. Average values of changes in the measured deflection amount depending upon the temperature change corresponding to the above-mentioned different conductive adhesives are plotted in relation with the mixed weight ratio of the conductive filler as a stress characteristics of the conductive epoxy resin adhesive versus mixed weight ratio of the conductive filler, and shown in FIG. 3. Average values of the measured bonding strength corresponding to the above-mentioned different conductive adhesives are plotted in relation with the mixed weight ratio of the conductive filler as a bonding strength characteristics of the conductive epoxy resin adhesive versus mixed weight ratio of the conductive filler, and shown in FIG. 4.

As will be apparent from these figures, if a mixing weight ratio of the conductive filler and the epoxy resin is selected in a range of 0.3-0.9 of the conductive filler against 1.0 of the epoxy resin, small stress of the adhesive and sufficient bonding strength can be expected.

According to the above-mentioned embodiment, since the conductive epoxy resin adhesive itself is locally heated and cured due to Joule effect by directly flowing current through this conductive adhesive, extremely effective curing of the epoxy resin can be expected. Thus, a short temporal bonding time less than 60 seconds can be attained.

Furthermore, it is not necessary that the positioning tools are heated in the oven together with the sliders and the suspensions during curing process of the adhesive. Thus, a large number of the positioning tools are not necessary depending upon the number of the magnetic heads to be manufactured. Therefore, alignment precision of all the positioning tools can be kept in a desired level and can be prevented from being thermally deteriorated. Particularly, since the conductive epoxy resin adhesive itself is heated, remaining portion can be prevented from increase of temperature.

Furthermore, since the thermosetting adhesive is used, a sufficient bonding strength can be expected at all bonding area. Also, using only one kind of adhesive will result high production efficiency. In addition, since the magnetic head slider 21 is conducted to the suspension 23 via the conductive adhesive 22, it is not necessary any conducting means is formed between them after the fixing.

Although a continuous DC current is supplied for curing the adhesive in the before mentioned embodiment, an intermittent pulse current having a duty ratio of for example 50% may be used instead of the DC current.

Figure 5:
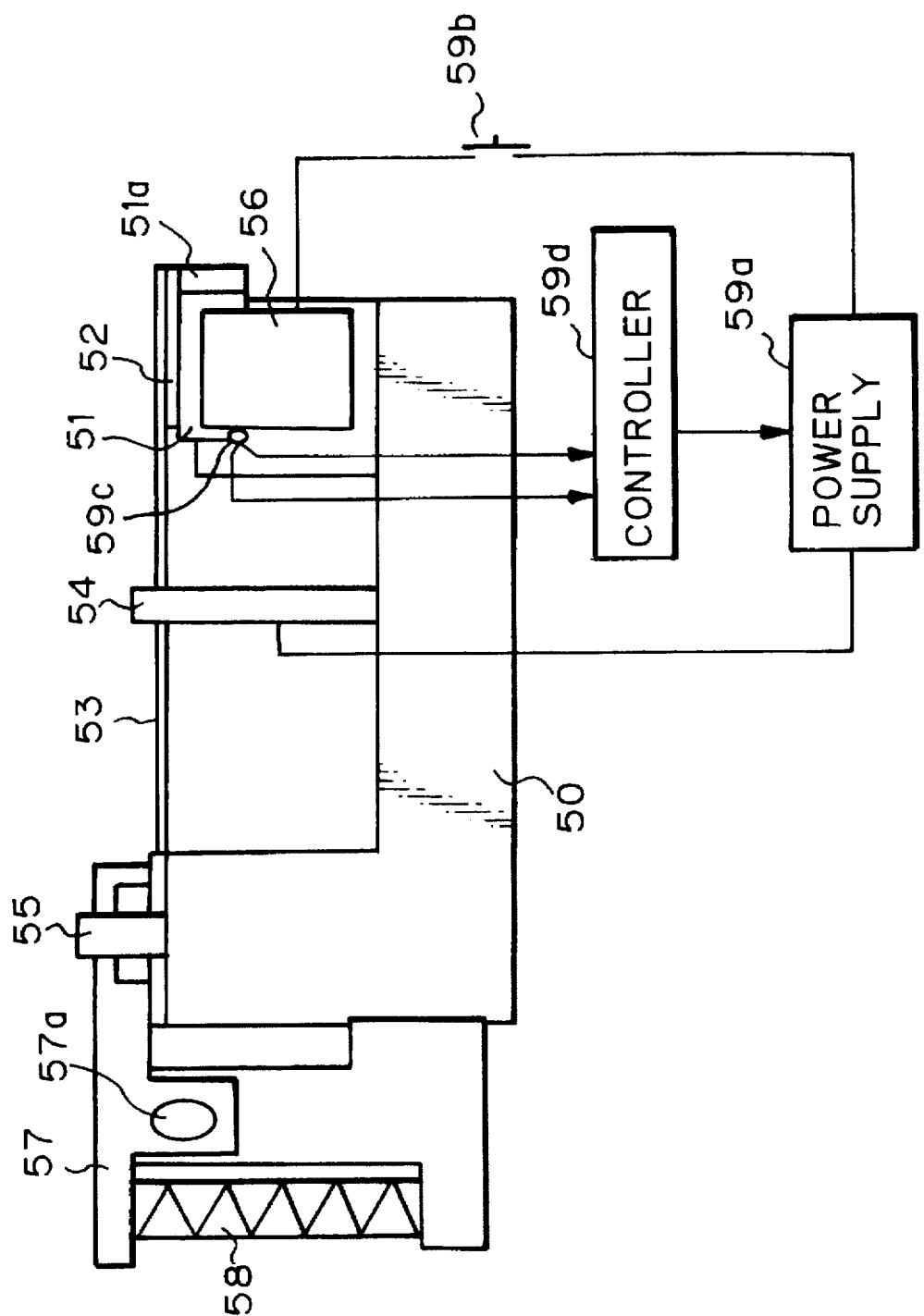
FIG. 5 shows a side view of a positioning tool with a magnetic head slider and a suspension in an another embodiment of a method according to the present invention.

FIG. 5 shows a side view of a positioning tool with a magnetic head slider and a suspension in an another embodiment of a method according to the present invention.

In the figure, a reference numeral 50 denotes a positioning tool for bonding, and 51 denotes a magnetic head slider mounted at a predetermined position on the positioning tool 50, respectively. A conductive thermosetting adhesive 52 is supplied on a bonding surface which is the opposite surface of the ABS (Air Baring Surface) of the slider 51. A slider support member such as a suspension 53 made of metal for example stainless steel is mounted at a predetermined position on the tool 50 so as to be superposed on the slider 51. An alignment of the suspension 53 is performed by means of a conductive alignment pin 54 inserted into a reference hole of the suspension 53 and by an electrically insulated alignment pin 55 inserted into an attachment hole of the suspension 53. In FIG. 5, furthermore, a reference numeral 58 denotes at least one conductive stopper abutted to at least one side surface of the slider 51, and 57 denotes a press member of the suspension 53. This press member 57 is attached to the tool 50 movably about a fulcrum 57a and actuated by a spring 58 so as to temporally fix a base portion of the suspension 53 to the tool 50.

A DC power supply 59a and a switch 59b are electrically connected in series between the conductive pin 54 and the conductive stopper 56. A thermo-couple 59c is contacted to the slider 51 to detect temperature of the thermosetting adhesive 52. A controller 59d electrically connected to the thermocouple 59c receives a detected signal from the this thermocouple 59c. The controller 59d controls output current from the power supply 59a depending upon the detected signal.

The DC power supply 59a is constituted by a power source with a regulator, which performs a constant voltage control when its load resistance is high and is switched into a constant current control when the load resistance lowers.

Almost portions of the tool 50 except for the conductive pin 54 and the conductive stopper 56 are made of insulator material. The magnetic head slider 51 is made of conductive material such as Al-TiC except for a magnetic head transducer portion 51a protected by an insulator material film. The suspension 53 is of course conductive because it is made of metal.

When the switch 59b turns on, a current from the DC power supply 59a flows through a loop of the conductive stopper 56, the magnetic head slider 51, the conductive thermosetting adhesive 52, the suspension 53 and the conductive pin 54 so that the conductive thermosetting adhesive 52 itself generates heat and is cured due to Joule effect caused by the current flowed through the adhesive 52. Strictly speaking, in addition to the generation of heat by the adhesive 52 itself due to Joule effect, the slider 51 and suspension 53 will somewhat generate heat due to Joule effect to contribute the thermal curing of the adhesive 52. The temperature of the themosetting adhesive 52 is precisely controlled by means of a feedback control loop constituted by the thermo-couple 59c, the controller 59d and the power supply 59a.

As the conductive thermosetting adhesive 52, the same epoxy resin is used as in the embodiment of FIG. 2.

Constitutions, operations and advantages of the temporal bonding process and of the fully bonding process in this embodiment are the same as these in the previous embodiment of FIG. 2 except that, in this embodiment, the temperature of the thermosetting adhesive 52 is controlled by means of the feedback control loop.

Figure 6:
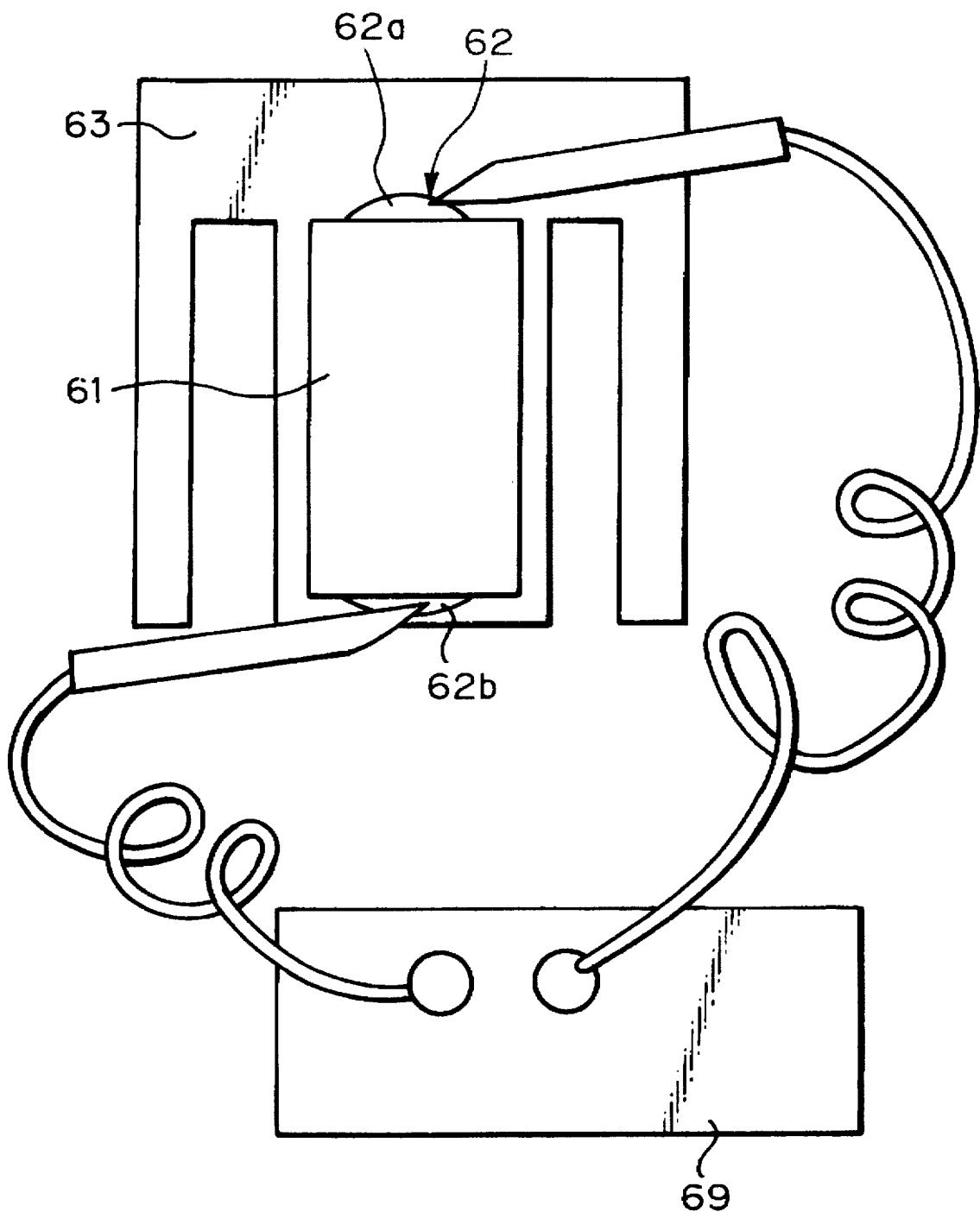
FIG. 6 schematically shows a constitution of a further embodiment of a fixing method according to the present invention.

FIG. 6 schematically shows a constitution of a further embodiment of a fixing method according to the present invention.

In the embodiments of FIGS. 2 and 5, the DC current for heating the adhesives 22 and 52 flows in a direction perpendicular to a supplied plane of the adhesives 22 and 52. However, in this embodiment of FIG. 6, a DC current for heating a conductive thermosetting adhesive 62 flows in a direction parallel to a supplied plane of the adhesive 62. As shown in the figure, the conductive thermosetting adhesive 62 is supplied on a bonding surface which is the opposite surface of the ABS (Air Baring Surface) of a magnetic head slider 61. A slider support member such as a suspension 63 made of metal for example stainless steel is superposed at a predetermined position on the slider 61.

A DC power supply 69 for providing a continuous DC current is electrically connected between both ends 62a and 62b of the conductive thermosetting adhesive 62. The DC power supply 69 is constituted by a power source with a regulator, which performs a constant voltage control when its load resistance is high and is switched into a constant current control when the load resistance lowers. Instead of the DC power supply, a pulse power supply for providing an intermittent pulse current may be used. In this case, a duty ratio will be for example 50%, a voltage to be applied will be 5 V and the pulse current will be limited to 2 A or less.

Constitutions, operations and advantages of the temporal bonding process and of the fully bonding process in this embodiment are the same as these in the previous embodiments of FIGS. 2 and 5 except for the applying direction of the DC current to the conductive thermosetting adhesive.

Figure 7:
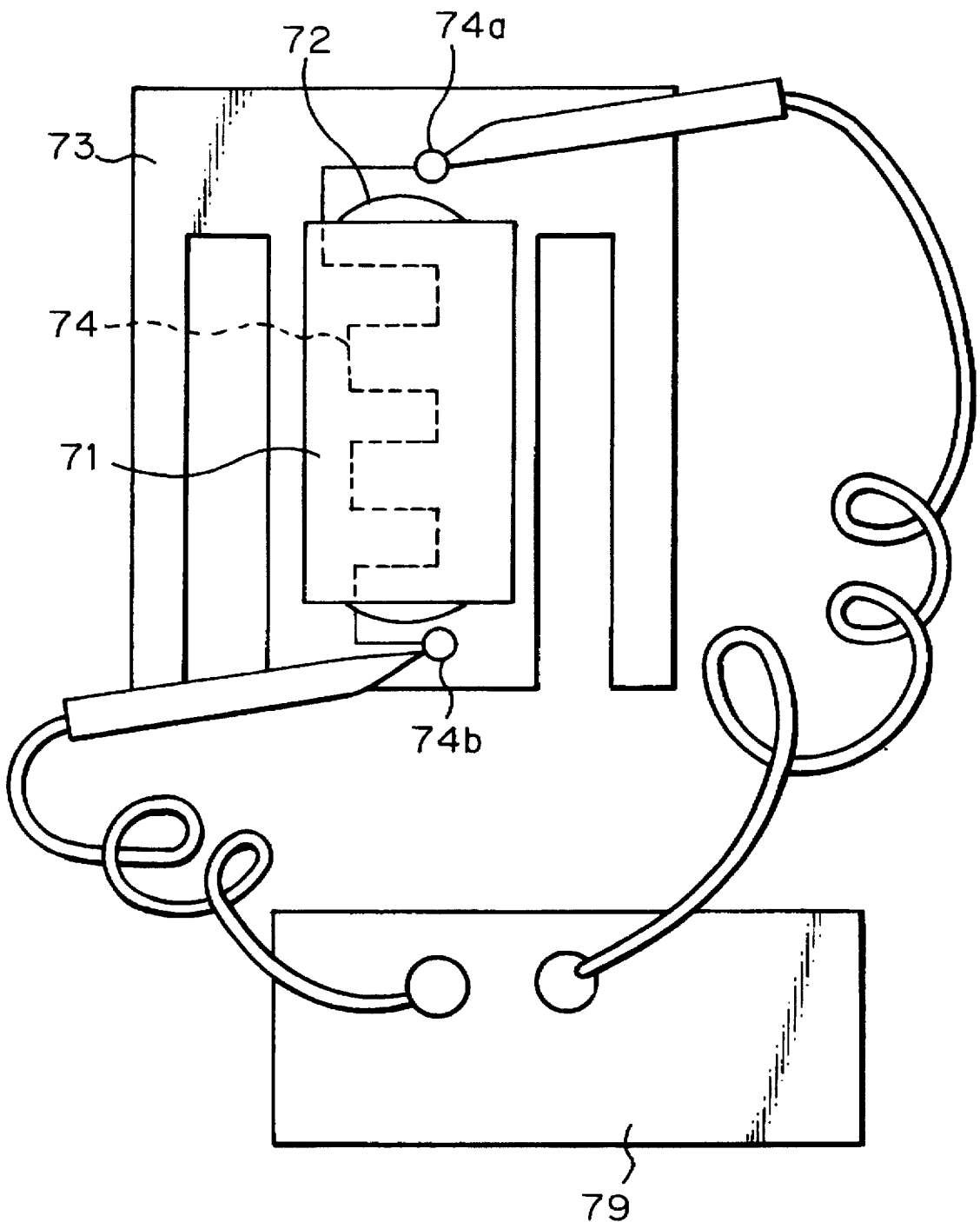
FIG. 7 schematically shows a constitution of a still further embodiment of a fixing method according to the present invention.

FIG. 7 schematically shows a constitution of a still further embodiment of a fixing method according to the present invention.

In the embodiments of FIGS. 2, 5 and 6, the DC current for heating the adhesives 22, 52 and 62 directly flows through this conductive adhesives 22, 52 and 62. However, in this embodiment of FIG. 7, a non-conductive thermosetting adhesive 72 such as an epoxy resin adhesive is heated to cure by flowing a DC current through a resister pattern 74 formed previously on a bonding surface of a suspension 73.

As shown in the figure, the non-conductive thermosetting adhesive 72 is supplied on a bonding surface which is the opposite surface of the ABS (Air Baring Surface) of a magnetic head slider 71. The slider support member such as the suspension 73 with the resister pattern 74 on its bonding surface is superposed at a predetermined position on the slider 71. In a modification, the resister pattern may be formed on the bonding surface of the slider 71.

A DC power supply 79 for providing a continuous DC current is electrically connected between both ends 74a and 74b of the resister pattern 74. The DC power supply 79 is constituted by a power source with a regulator, which performs a constant voltage control when its load resistance is high and is switched into a constant current control when the load resistance lowers. Instead of the DC power supply, a pulse power supply for providing an intermittent pulse current may be used. In this case, a duty ratio will be for example 50%, a voltage to be applied will be 5 V and the pulse current will be limited to 2 A or less.

According to this embodiment, since the epoxy resin adhesive 72 is locally heated and cured due to Joule effect by flowing current through the resister pattern 74 formed in contact with the adhesive, extremely effective curing of the epoxy resin can be expected. Thus, a short temporal bonding time can be attained.

Another constitutions, operations and advantages of the temporal bonding process and of the fully bonding process in this embodiment are the same as these in the embodiments of FIGS. 2, 5 and 6.

It is apparent that a fixing method according to the present invention can be applied to any cases for fixing a member which is not limited to a magnetic head slider with an another member such as for example an electronic element or others.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for fixing a magnetic head slider with a slider support member, said method comprising the steps of:

mounting the magnetic head slider and the slider support member at a predetermined alignment position on a positioning tool for bonding, a conductive thermosetting adhesive being inserted between said magnetic head slider and said slider support member to be bonded with each other;

temporally bonding the magnetic head slider with the slider support member by flowing a current directly through said conductive thermosetting adhesive so that said adhesive is cured itself due to Joule effect caused by the current flowed through the adhesive;

removing the temporally bonded magnetic head slider and slider support member from the positioning tool; and fully bonding the magnetic head slider with the slider support member by further curing the adhesive.

2. The method as claimed in claim 1, wherein said method further comprising a step of detecting real temperature of said conductive thermosetting adhesive, and wherein said flowing step includes a step of adjusting the current flowing through the conductive thermosetting adhesive depending upon the detected real temperature.

3. The method as claimed in claim 1, wherein said conductive thermosetting adhesive is made of an epoxy resin adhesive with a conductive filler.

4. The method as claimed in claim 3, wherein said conductive filler is made of a silver filler.

5. The method as claimed in claim 3, wherein a mixed weight ratio of the conductive filler against the epoxy resin is 0.3–0.9 of the conductive filler against 1.0 of the epoxy resin.

6. The method as claimed in claim 1, wherein said current flowed through the conductive thermosetting adhesive is a DC current.

7. The method as claimed in claim 6, wherein said DC current is controlled by switching from a constant voltage control to a constant current control depending upon a resistance of said conductive thermosetting adhesive.

8. The method as claimed in claim 1, wherein said current flowed through the conductive thermosetting adhesive is an intermittent pulse current.

* * * * *